July 8, 1947.  M. B. KELLEY  2,423,652
TIRE REMOVING APPARATUS
Filed Oct. 3, 1944  3 Sheets-Sheet 1

INVENTOR.
MERLE B. KELLEY.
BY Archworth Martin
his ATTORNEY.

July 8, 1947. M. B. KELLEY 2,423,652
TIRE REMOVING APPARATUS
Filed Oct. 3, 1944 3 Sheets-Sheet 2

INVENTOR.
MERLE B. KELLEY.
Archworth Martin
his ATTORNEY.

INVENTOR.
MERLE B. KELLEY.
BY Archworth Martin
his ATTORNEY.

Patented July 8, 1947

2,423,652

UNITED STATES PATENT OFFICE 2,423,652

TIRE REMOVING APPARATUS

Merle B. Kelley, Washington, Pa., assignor, by direct and mesne assignments, to Kel-Mar Tire Remover Company, Pittsburgh, Pa., a corporation of Pennsylvania Application October 3, 1944, Serial No. 556,940

2 Claims. (Cl. 157—6)

My invention relates more particularly to a form of tire removing apparatus that is especially suited for removing tires from rims or wheels that have wide tire seating surfaces and a removable retaining ring at one edge of such surface.

In the case of large tires, and particularly truck tires, as much as 15 tons pressure may be required to push a tire from its rim and frequently several hours work is required in order to loosen a tire and push it from the rim. Again, even though some form of mechanically-operated tire removing apparatus is employed, difficulty is experienced in handling the heavy tires when positioning the rims for tire removal by the apparatus.

One object of my invention is to provide an improved form of tire removing apparatus which possesses greater strength than various forms of apparatus that have heretofore been employed and which can be manipulated so readily as to remove a tire quickly and without damage to the tire rim or the tire.

Another object of my invention is to provide tire removing apparatus wherein pusher elements are provided of such form and moved in such paths they will exert the pushing forces mainly at the base or bead of the tire, with little or no pressure against the side wall of the tire and without exerting a direct thrust on the peripheral wall of the rim.

Another object of my invention is to provide means for conveniently lifting the tire and their rims into proper position for tire removing.

Figure 1:
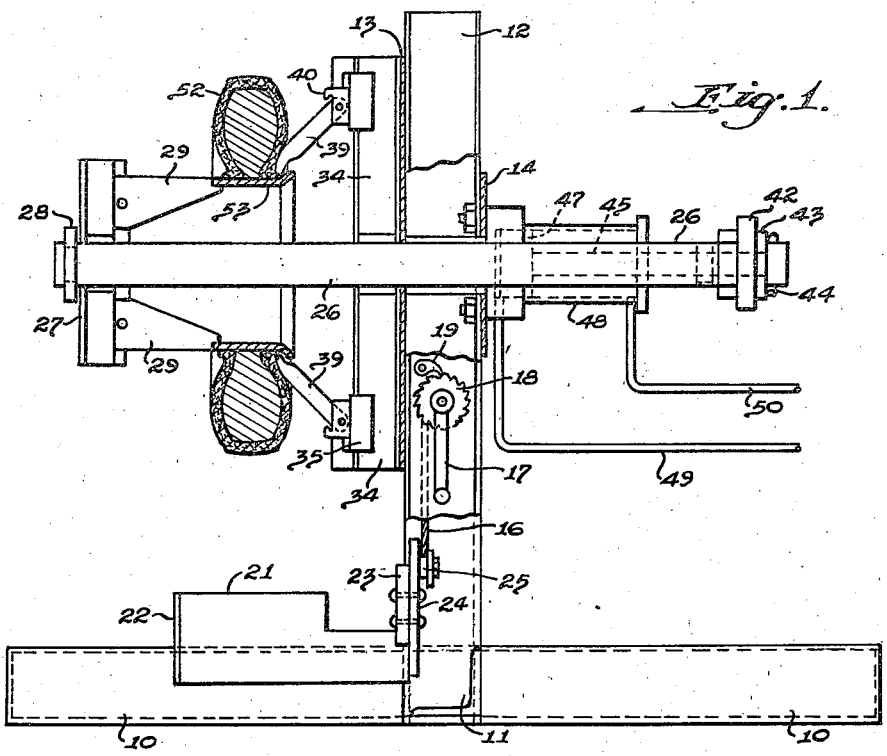
Figure 2:
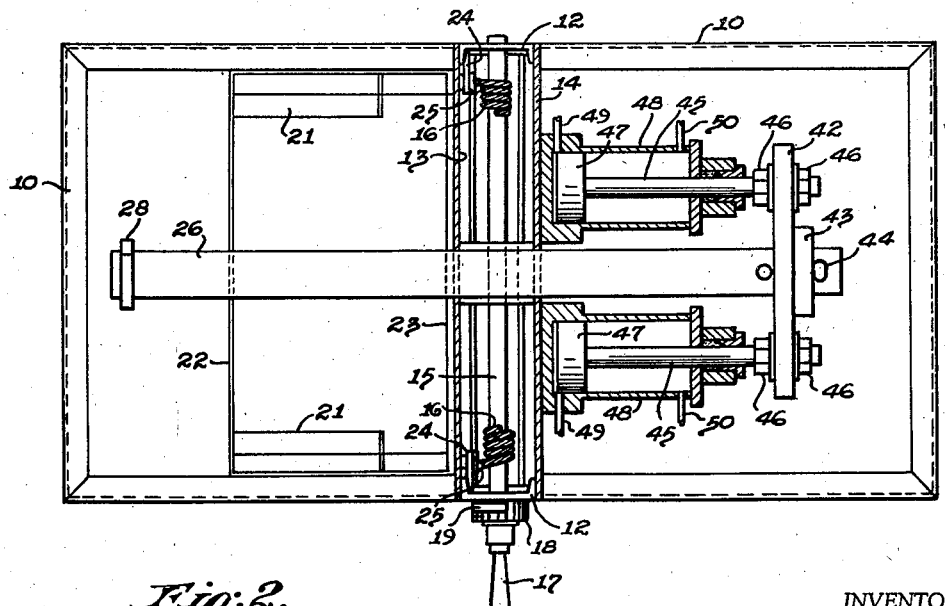
Figure 3:
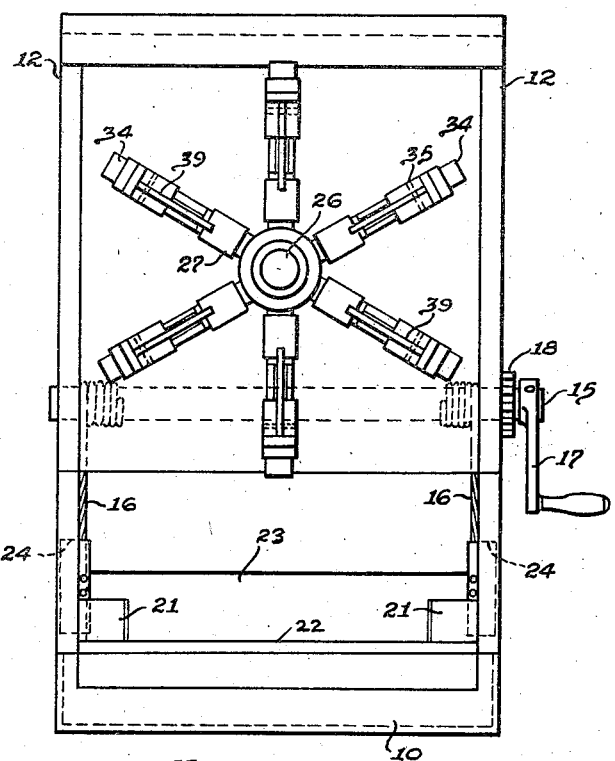
Figures 4, 5:
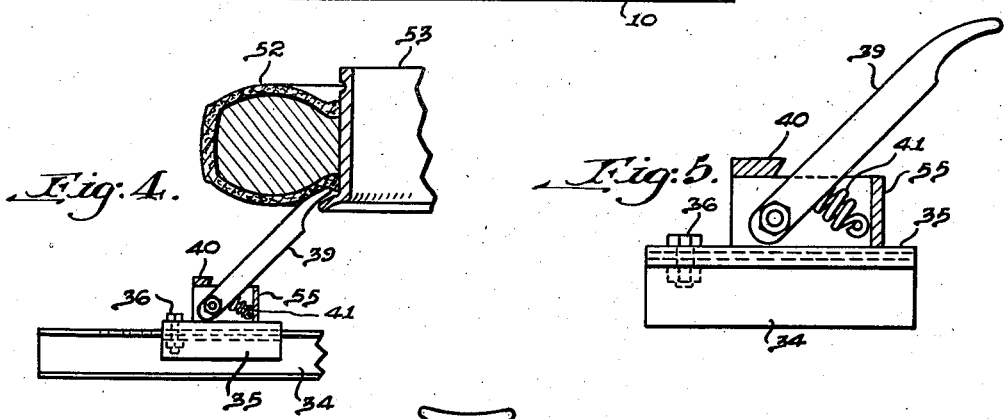
Figure 6:
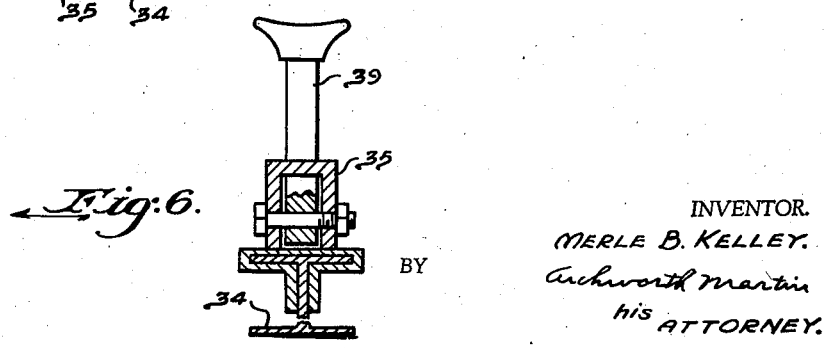
Figure 9:
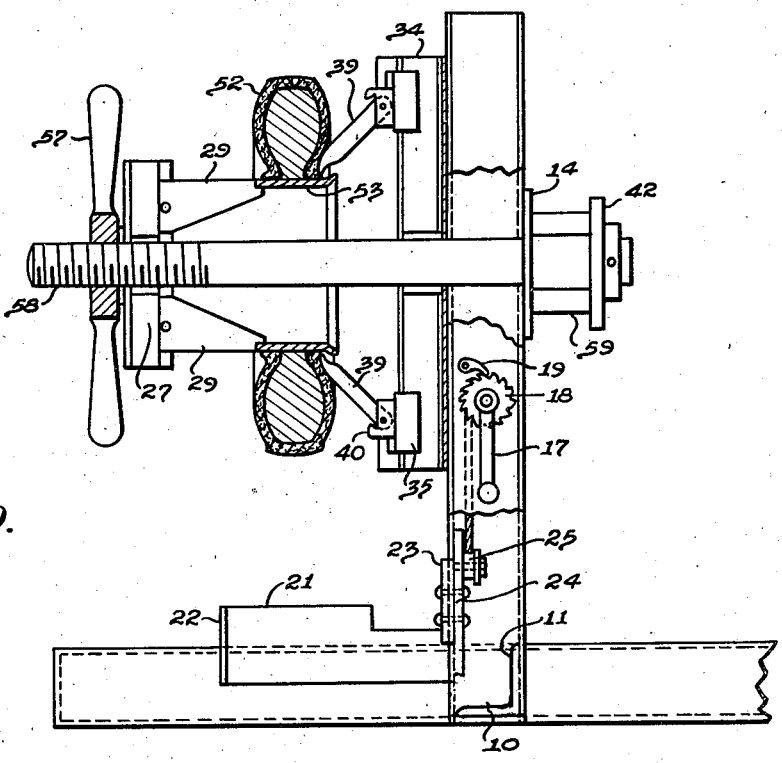
Figures 7, 8:

In the accompanying drawings, Figure 1 is a vertical sectional view through the apparatus; Fig. 2 is a sectional plan view thereof with the tire and its supporting spider omitted; Fig. 3 is a front view of the apparatus; Figs. 4 and 5 are enlarged views of portions of the structure of Fig. 1; Fig. 6 is an enlarged sectional view showing one of the pusher fingers of Fig. 4 and its mounting; Fig. 7 is a side view on an enlarged scale of one of the rim-centering and holding elements of Fig. 1; Fig. 8 is a plan view thereof, and Fig. 9 shows a modification of a portion of the apparatus of the other figures.

The apparatus comprises a base frame 10 of rectangular shape formed of channels suitably welded together, a cross bar 11 forming part of the frame. A pair of upright channels 12 are secured to the frame and have plates 13 and 14 secured to their front and rear sides, the plates having openings at their mid portions through which some of the tire-removing apparatus extends.

A shaft 15 is journaled in the uprights 12 and serves as a winch on which lifting cables 16 are wound when the handle 17 of the shaft is turned. The shaft 15 has a rachet wheel 18 that is engaged by a pawl 19 which is pivoted on one of the upright channels 12, to temporarily hold the shaft against turning under the weight of a wheel. The hoist for raising the wheel of a tire or tire rim into position for removal of the tire comprises seating blocks 21 that are connected together by cross bars or plates 22, 23 and 24. The plates 24 extend into the channels and have ears 25 that are connected to the cables 16. The hoist blocks or seats 21 will be lowered flush with the frame to permit a heavy tire to be conveniently rolled into place, whereupon the winch will be turned to raise the rim and tire into position to be engaged by the rim holding and tire removing elements, whereupon the pawl 19 will be released to free the hoist from the tire.

A shaft 26 extends through holes in the plates 13 and 14 and at its front end supports a spider 27 that is formed of I-beams and is removably held in place on the shaft by a yoke-shaped key 28 that engages grooves or slots in the shaft. The spider is provided with rim-centering arms 29 whose bases are of channel form for slidable engagement with flanges of the I-beams 27, and for adjustment thereon by means of bolts 31 that extend through holes in the arms and a series of holes in the I-beams, as shown more clearly in Figs. 7 and 8. This permits the adjustment of the centering and holding arms 29 to rims and wheels of various diameters, the extremities of the arms 29 being notched to vertically support the rims and to hold them against axial movement during tire removing thrusts of the pusher fingers to be hereinafter described. Mounted on the forward side of the plate 13 are a series of radially-disposed I-beams 34 that support brackets 35 which are slidable thereon and are adjustable radially thereof by bolts 36 which extend through holes in the brackets and I-beams, to effect radial adjustment of the brackets to tire rims of various diameters, as shown more clearly in Fig. 4.

Each bracket has a pusher finger 39 pivotally mounted thereon for engagement with a tire and tire rim to remove the tire from the rim. As shown more clearly in Fig. 5, springs 41 hold the fingers in outwardly expanded position, the outward movement thereof being limited by stop shoulders 40 on the brackets 35, so that when the tire is brought into position against the fingers, it will be properly engaged thereby.

A cross head 42 loosely receives the shaft 26 and has connection therewith through a washer 43 and a stop pin 44 which is movable into various holes in the shaft to permit of adjusting the relative positions of the shaft and the cross head. The cross head carries a pair of piston rods 45 which are threaded at their outer ends to receive nuts 46 which connect them to the cross head. The piston rods have pistons 47 working in cylinders 48 that are secured to the plate 14. Fluid pressure is admitted to opposite sides of the piston through pipes 49 and 50 to effect longitudinal movements of the shaft or pull rod 26.

The operation of the apparatus is as follows, particularly with tire and rims of great weight. The key 28 is removed whereupon the pull rod 26 will be slid backwardly to clear the way for raising a tire 52 with its rim 53, whereupon the wheel or rim is rolled into place on the tire hoist 21 and the winch turned to raise the same. Thereupon the shaft will be slid back to the position shown in Fig. 2, and the spider 27 and the key 28 placed thereon, the arms 29 being adjusted to the rim diameter, the brackets 35 also being properly adjusted on the radial arms 34. Pressure is then admitted through the pipes 49 to the front sides of the pistons 47 to force the cross head 42 and the rod 26 to the right, thus pushing the tire and rim against the fingers 39 as shown in Fig. 1. The tire hoist will then be lowered, or left in place, as desired. Thereupon continued fluid pressure will cause the fingers 39 to be pushed down between the tire and the rim and to break the adhesion between the tire and the rim and remove the tire.

An important feature of my invention resides in the provision of a stop shoulder 55 on each of the brackets 35 to limit the inward swinging movement of the fingers 39 so that they will have little, if any, thrust engagement with the flat or straight surface on the rim. Great forces are frequently required in order to remove the tires that are frozen on rims and if this provision were not made for limiting inward movement of the finger ends, they would frequently damage or even punch holes through the sheet metal rims.

When the tire has been pushed from the rim, fluid pressure will be admitted through the pipe 50 to the rear sides of the pistons 47 to retract the cross head 42 from the washer 43, so that the rod 26 and the arms 29 can be moved to the left. Thereupon the key 28 and spider 27 can be removed and the rod 26 pushed to the right to render the apparatus ready to receive another rim and its tire.

In Fig. 9, I show an arrangement wherein a hand wheel 57 is employed for shifting the arms 29 to push the tire and the rim against the fingers 39, the power cylinders being omitted, although this hand operation can be used on apparatus that also has the cylinders, if desired. The wheel 57 has threaded engagement with the pull rod 58 whose cross head 42 has thrust engagement with the plates 14 on the uprights 12, through spacer blocks 59.

In both forms of the apparatus, the shapes of the pusher fingers and the stop shoulders at 40—55 are so arranged that when the brackets 35 are radially adjusted in accordance with the size of a tire rim, the fingers will be brought into proper angular positions to be forced between the tire bead and the inner side of the rim flange. This will avoid excessive pressure against and damage to the side wall of the tire. At the same time, the shoulders at 55 prevent excessive thrust against the rim and damage to it, and all of the thrust that is exerted through the fingers will be brought to bear in the most effective direction, against the tire bead.

While I have, in the specification and claims referred more particularly to tire rims, it will be understood that the apparatus can be used in removing tires from wheels wherein the tire rim constitutes a part of the wheel structure and is not separable therefrom.

I claim as my invention:

1. Tire removing apparatus, comprising pusher elements engageable with one edge of a rim, fingers arranged in an annular path, in position to enter between a tire and the other edge of the rim, brackets pivotally supporting the fingers in sloping relation to the peripheral surface of the rim, means for moving the pusher elements and the brackets relative to one another, in an axial direction, to cause the free ends of the fingers to push the tire from the rim, means limiting outward swinging movements of the inner ends of the fingers, springs yieldably holding the fingers at their outer limits of movement, and stop shoulders on the brackets, in position to limit pivotal movements of the fingers toward the rim to points at which they will be in proximity to the peripheral surface of the rim, but out of thrust engagement therewith, said stop shoulders being located radially inward of the pivotal supports for their respective fingers, in position to receive the major portion of thrust forces imposed upon the fingers.

2. Tire removing apparatus, comprising a horizontal pull rod, an upright support through which the rod extends, a rim-engaging member releasably mounted on the rod adjacent to the inner end thereof for engagement with one edge of a tire rim, pusher fingers on the upright support positioned to enter between the other edge of the rim and its tire, a fluid-pressure piston and cylinder on that side of the support which is adjacent to the outer end of the rod and parallel with the rod, a connection between the piston and the rod, for shifting the rod in a direction to move the said rim-engaging member toward the pusher fingers, the connection comprising an abutting element carried by the outer end of the rod, a pusher element carried by the piston, the element on the rod being positioned at the outer side of the element on the piston, for abutting engagement thereby, the rod and its abutting element being movable outwardly, independently of the piston and its pusher element when the said rim-engaging member is removed from the rod, and means carried by and movable relative to the upright support, for supporting a rim and its tire in upright position and raising them into place coaxially of the rod when the said rim-engaging member is removed and the rod has been given sufficent further movement independently of the piston.

MERLE B. KELLEY.

REFERENCES CITED

The following references are of record in the file of this patent:

UNITED STATES PATENTS

| Number | Name | Date |
|---|---|---|
| 1,724,813 | Weaver et al. | Aug. 13, 1929 |
| 2,373,975 | Plumeau et al. | Apr. 17, 1945 |
| 1,564,496 | Staugaard | Dec. 8, 1925 |
| 2,043,169 | Nawkinson | June 2, 1936 |
| 2,238,424 | McQuade | Apr. 15, 1941 |

FOREIGN PATENTS

| Number | Country | Date |
|---|---|---|
| 395,405 | Germany | July 1, 1922 |